(12) United States Patent
Thomason et al.

(10) Patent No.: US 11,075,874 B2
(45) Date of Patent: Jul. 27, 2021

(54) INTELLIGENT ELECTRONIC COMMUNICATIONS ACROSS HETEROGENEOUS COMMUNICATION CHANNELS

(71) Applicant: INTERNATIONAL BUSINESS MACHINES CORPORATION, Armonk, NY (US)

(72) Inventors: Lowell Thomason, Byron, MN (US); John Rud, Rochester, MN (US); Kenneth Trisko, Stewartville, MN (US); Ronald Stanley Wesely, Rochester, MN (US); Timothy Brandt, Elysian, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/360,454

(22) Filed: Mar. 21, 2019

(65) Prior Publication Data
US 2020/0304451 A1 Sep. 24, 2020

(51) Int. Cl.
*H04L 12/58* (2006.01)
*H04L 12/66* (2006.01)
*H04L 29/12* (2006.01)

(52) U.S. Cl.
CPC ............ *H04L 51/28* (2013.01); *H04L 12/66* (2013.01); *H04L 61/1564* (2013.01); *H04L 61/1576* (2013.01)

(58) Field of Classification Search
None
See application file for complete search history.

(56) References Cited

U.S. PATENT DOCUMENTS

| 6,427,164 | B1 | 7/2002 | Reilly |
| 6,529,500 | B1* | 3/2003 | Pandharipande ....... H04L 29/06 370/352 |
| 6,999,565 | B1* | 2/2006 | Delaney ............... G06Q 10/107 379/67.1 |
| 7,251,696 | B1* | 7/2007 | Horvitz ................ G06Q 10/107 709/228 |
| 7,369,540 | B1* | 5/2008 | Giroti ..................... H04L 12/66 370/352 |
| 7,529,801 | B2 | 5/2009 | Moore |
| 7,844,666 | B2 | 11/2010 | Horvitz |

(Continued)

FOREIGN PATENT DOCUMENTS

WO 2001071539 A2 9/2001

*Primary Examiner* — Scott B Christensen
(74) *Attorney, Agent, or Firm* — Cantor Colburn LLP; Tihon Poltavets

(57) ABSTRACT

A computer-implemented method includes receiving, at a gateway, a message for a recipient, responsive to the message being sent to the recipient at a first address. One or more rules are evaluated to select a preferred communication channel of the recipient, from among two or more communication channels. A channel-specific address of the recipient on the preferred communication channel is determined, where the channel-specific address differs from the first address. The message is directed, by the gateway, to the channel-specific address of the recipient to deliver the message to the recipient through the preferred communication channel.

20 Claims, 6 Drawing Sheets

(56) References Cited

U.S. PATENT DOCUMENTS

| | | | |
|---|---|---|---|
| 8,225,232 B2* | 7/2012 | Sundararaman | H04M 3/53 715/717 |
| 9,513,781 B2 | 12/2016 | Hartwell | |
| 9,577,966 B1 | 2/2017 | Dorsey | |
| 2002/0007421 A1* | 1/2002 | Dixon | H04L 29/1215 709/238 |
| 2002/0105969 A1* | 8/2002 | Benedyk | H04W 92/14 370/466 |
| 2002/0120697 A1* | 8/2002 | Generous | H04L 67/306 709/206 |
| 2005/0021638 A1* | 1/2005 | Caldini | G06Q 10/109 709/206 |
| 2005/0163108 A1* | 7/2005 | Moore | H04L 51/28 370/352 |
| 2007/0073888 A1* | 3/2007 | Madhok | H04L 67/146 709/227 |
| 2007/0299927 A1 | 12/2007 | Knauerhase | |
| 2014/0082103 A1* | 3/2014 | Baxter, Jr. | H04L 51/36 709/206 |
| 2016/0173422 A1 | 6/2016 | Kidron | |
| 2018/0198745 A1* | 7/2018 | Talwar | H04L 51/26 |

* cited by examiner

INTELLIGENT ELECTRONIC COMMUNICATIONS ACROSS HETEROGENEOUS COMMUNICATION CHANNELS

BACKGROUND

The present invention relates to electronic communications and, more specifically, to intelligent electronic communications across heterogeneous communication channels.

Multiple mechanisms of electronic communications exist today. These include text messaging, email, phone calls, tweeting, voice mail, and messaging through various applications. In some cases, different mechanisms of communication require the installation and use of specific applications.

SUMMARY

Embodiments of the present invention are directed to a computer-implemented method for delivering a message through a preferred communication channel. A non-limiting example of the computer-implemented method includes receiving, at a gateway, a message for a recipient, responsive to the message being sent to the recipient at a first address. One or more rules are evaluated to select a preferred communication channel of the recipient, from among two or more communication channels. A channel-specific address of the recipient on the preferred communication channel is determined, where the channel-specific address differs from the first address. The message is directed, by the gateway, to the channel-specific address of the recipient to deliver the message to the recipient through the preferred communication channel.

Embodiments of the present invention are directed to a system for delivering a message through a preferred communication channel. A non-limiting example of the system includes a gateway having a memory and one or more computer processors, which are communicatively coupled to the memory. The one or more computer processors are configured to receive a message for a recipient, responsive to the message being sent to the recipient at a first address; evaluate one or more rules to select a preferred communication channel of the recipient, from among two or more communication channels; determine a channel-specific address of the recipient on the preferred communication channel, where the channel-specific address differs from the first address; and direct the message to the channel-specific address of the recipient to deliver the message to the recipient through the preferred communication channel.

Embodiments of the invention are directed to a computer-program product for delivering a message through a preferred communication channel, the computer-program product including a computer-readable storage medium having program instructions embodied therewith. The program instructions are executable by a processor to cause the processor to perform a method. A non-limiting example of the method includes receiving, at a gateway, a message for a recipient, responsive to the message being sent to the recipient at a first address. Further according to the method, one or more rules are evaluated to select a preferred communication channel of the recipient, from among two or more communication channels. A channel-specific address of the recipient on the preferred communication channel is determined, where the channel-specific address differs from the first address. The message is directed, by the gateway, to the channel-specific address of the recipient to deliver the message to the recipient through the preferred communication channel.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
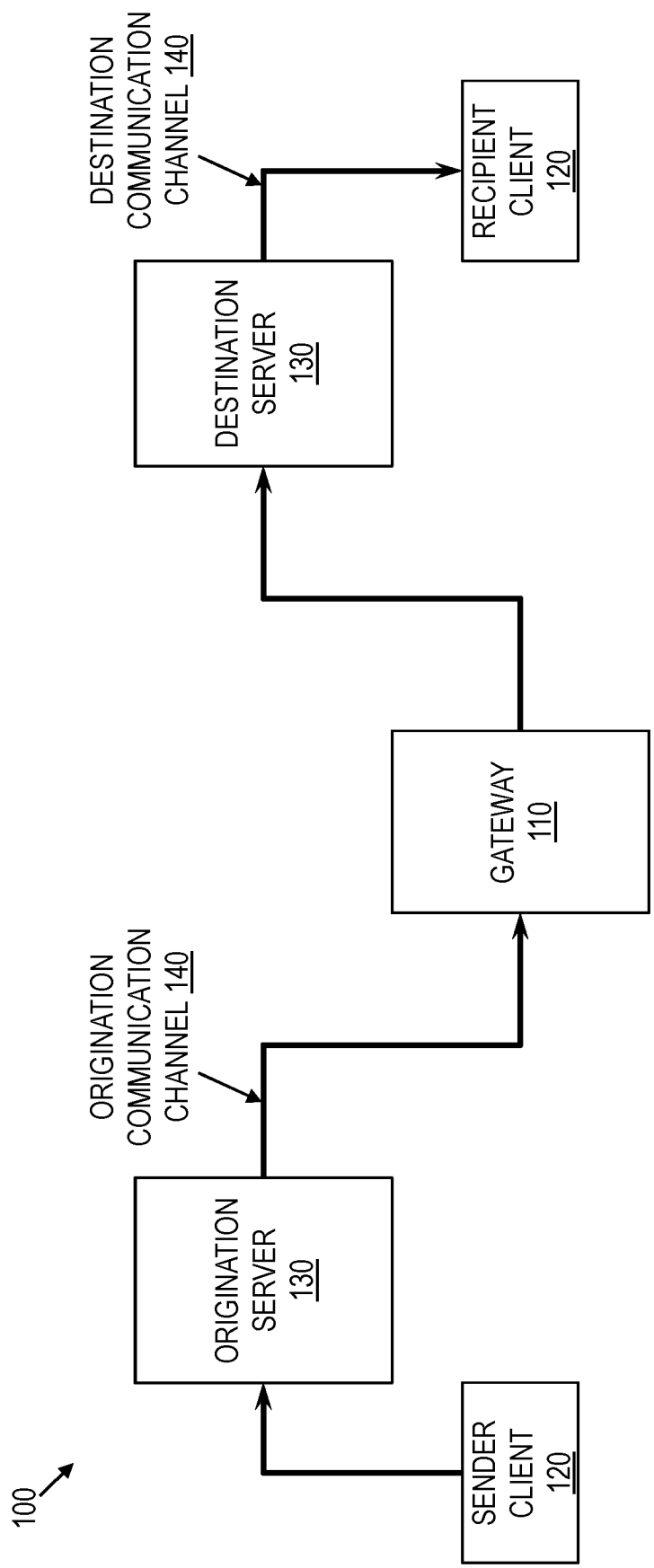
FIG. 1 is a block diagram of a communication system for intelligently communicating across heterogeneous communication channels, according to some embodiments of the invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, some users prefer some mechanisms of communications while other users have other preferences. In many cases, a first user might be unfamiliar with an application preferred by a second user for communications. As a result, the first user may send messages that the second user never receives, or receives slowly, or the first and second users will have to compromise and use an application that neither of them or only one of them prefers. As a result, one or both users may be at a disadvantage with respect to sending or receiving communications as the users may not be proficient in the applications being used.

Turning now to an overview of the aspects of the invention, one or more embodiments of the invention address the above-described shortcomings of the prior art by providing a mechanism to transfer a message from an origination channel used by a sender, to a destination channel preferred by a recipient. A gateway receives the message through the origination channel and evaluates one or more rules, set or approved by the recipient, to determine a preferred communication channel of the recipient. As needed, the gateway converts the message to a format appropriate for the preferred communication channel. The gateway then retransmits the message to the recipient through the preferred communication channel, which acts as the destination channel. In some embodiments of the invention, the recipient is associated with a universal address useable by the sender to reach the recipient across various communication channels. In that case, the universal address directs the origination channel to the gateway, such that the gateway receives the message and can retransmit the message through the recipient's preferred communication channel.

The above-described aspects of the invention address the shortcomings of the prior art by enabling a sender to transmit a single communication to one or more recipient users, such that the communication is received at the respective preferred communication channel of each recipient user, without the sender having to know the preferred communication channels of the recipient users. Further, embodiments of the invention convert the message into the appropriate format for each preferred communication channel as needed, such that each recipient user receives the message in an appropriate format for the respective preferred communication channel. As a result, each user is enabled to use his or her preferred communication channel, without a requirement to be aware of other users' preferred communication channels.

Embodiments of the invention have a wide range of uses in addition to, or as an alternative to, messaging on an everyday basis. For example, and not by way of limitation, embodiments of the invention may be used for emergency alerts, such as medical alerts, fire alerts, law enforcement alerts, or credit card fraud alerts. For instance, such an emergency alert may be sent to a recipient as usual and, through the gateway, may be delivered to the recipient at a preferred communication channel, thereby enabling the recipient to receive the message more quickly. Embodiments of the invention are also useful for non-emergency alerts, such as customer communications by a company, family communications, education communication (e.g., alerts of snow days or child illnesses), or delivery notifications.

Turning now to a more detailed description of aspects of the present invention, FIG. 1 is a block diagram of a communication system 100 for intelligently communicating across heterogeneous communication channels, according to some embodiments of the invention. As shown in FIG. 1, the communication system 100 may include a gateway 110 in communication with a client 120 or a server 130 or both.

The client 120 may be a messaging client 120 used to transmit or receive messages. The client 120 may be a standalone application or a web-based client 120, for example. Typically, the client 120 is in communication with a corresponding server 130, utilized to relay messages from one user to another. More specifically, the client 120 may transmit messages to the server 130 for delivery through a communication channel 140 associated with the server 130, or the client 120 may receive messages from the server 130 through the communication channel 140 associated with the server 130. For example, and not by way of limitation, the client 120 may be an email client 120, and the server 130 may be a corresponding email server 130. When a sender uses an email client 120 to send an email to a recipient's email address, conventionally, the email is transmitted to an email server 130, which pushes the email to an email client 120 of the recipient or enables the email client 120 of the recipient to pull the email on demand. It will be understood that the use of a client 120 and server 130 is applicable to a wide range of messaging applications (e.g., text messaging, social media messaging, voice mail) and is not limited to email.

The gateway 110 may be a server for the communications system 100, such as a server application or one or more computer systems, or portions thereof, operating as a server. The gateway 110 may maintain a set of user accounts, each of which is associated with a user registered with the communication system 100. Each user account may include one or more of the following: an identifier (e.g., a name, username, unique number or string, or email address), a universal address, and one or more channel-specific addresses. For the purposes of this disclosure, an address is a string or other data type used to address a user. An address may include one or several pieces of information, which together address and identify a user uniquely. For example, and not by way of limitation, an address may be one of the following: an email address, a social media platform in combination with a user name on the social media platform, or a phone number.

A channel-specific address may identify a user in a way that is specific to one or more communication channels 140. For instance, a phone number is a channel-specific address that is specific to phone calls and text messages, while an email address is a channel-specific address that is specific to email through a specific email server. According to this disclosure, a communication channel 140, also referred to as a channel 140, is a line of communication or type of communication, such as text messaging, email, or a particular social media platform. Typically, each communication channel 140 may be represented by a server 130, which may relay communications associated with that channel 140. Thus, a message is deemed transmitted through a particular communication channel 140 when a server 130 associated with that communication channel 140 transmits the message.

In contrast, in some embodiments of the invention, a universal address is an address utilized in the communication system 100 to address a recipient without regard to communication channel 140. The universal address of a user may be used to address the user across various clients 120 and across various communication channels 140. Upon registration with the communication system 100, a user may be assigned one or more universal addresses, which may be associated with the user account and, thus, with the user. In some embodiments of the invention, only a single universal address is assigned to each user, but variations of the universal address may be generated with an appropriate format as needed for various communication channels 140.

In some embodiments of the invention, a sender is enabled to provide a recipient's universal address to a messaging client 120 selected by the sender, and the communication system 100 may route the message to the recipient through a preferred communication channel 140 of the recipient, such that the message is delivered to the recipient through the recipient's preferred communication channel 140. In other words, although the sender's chosen client 120 may typically transmit message to an origination server 130 for transmission through an origination communication channel 140, the message may ultimately be delivered to the recipient through a destination communication channel 140 (e.g., by way of a destination server 130) preferred by the recipient, as long as the recipient is registered with the communication system 100. In still other words, the sender may send the message through an origination communication channel 140, but the message may be delivered through a destination communication channel 140 different from the origination channel 140. The sender can, but need not, be aware of the communication system 100 or of the change in communication channels 140.

In some embodiments, to this end, for each communication channel 140 supported by the communication system 100, use of a universal address directs a message to the gateway 110. For instance, for each universal address assigned within the communication system 100, the server 130 associated with each supported communication channel 140 may associate that universal address with the communication system 100. This may be implemented, for instance, by the communication system 100 registering each universal address with each supported communication channel 140 (e.g., with each associated server 130). Thus, when a sender transmits a message to a universal address of a recipient, the message may be directed through the server 130 of the communication channel 140 to the gateway 110. The gateway 110 may then map the universal address to the associated user account (i.e., to the recipient's user account).

The gateway 110 may determine a preferred communication channel 140 of the recipient and may direct the message through the preferred communication channel 140 to the recipient, by either directly or indirectly transmitting the message through that preferred communication channel 140. For instance, the gateway 110 may send the message to a channel-specific address of the recipient, where that channel-specific address is specific to the preferred communication channel 140. As such, a server 130 associated with the preferred communication channel 140 may receive the message as per standard operation of the server 130 in servicing the communication channel 140. The server 130 may transmit the message to the recipient through that communication channel 140 as typically performed by the server 130. The process by which the gateway 110 determines the preferred communication channel 140 for the recipient will be described in detail below.

As a result, a user may provide his or her universal address to others, without regard for the communication channels 140 used by such others. When a sender sends a message to the recipient using the universal address, the message arrives through the preferred communication channel 140 of the user, according to some embodiments of the invention. Further, the sender need not be aware that the universal address is universal and may simply use the universal address in the manner in which the sender typically sends messages through the sender's preferred client 120.

Further, it will be understood that embodiments of the invention can be extended to the use of multiple recipients for each message, for the case when a sender specifies multiple recipients to receive a single message. In that case, the tasks described herein for determining the recipient's preferred communication channel 140 may be performed for each such recipient.

Figure 2:
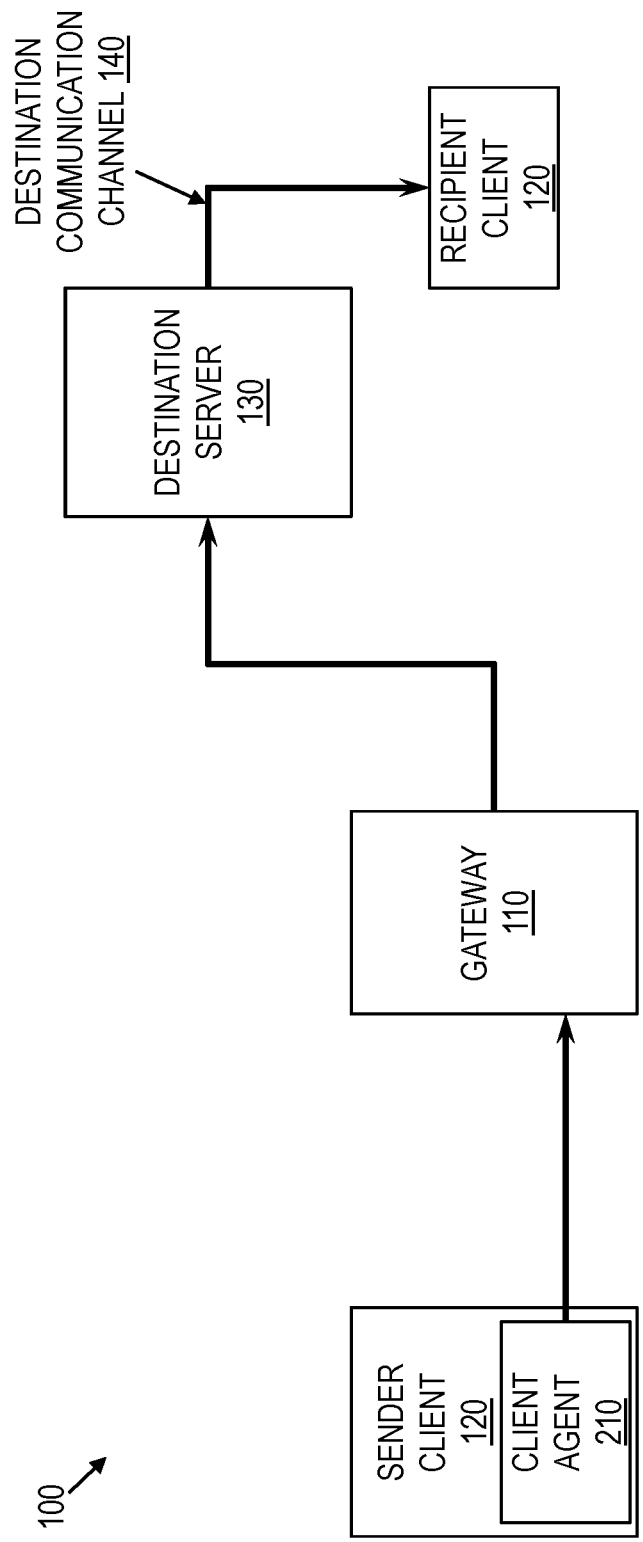
FIG. 2 is another block diagram of the communication system, according to some embodiments of the invention.

FIG. 2 is another block diagram of the communication system 100, according to some embodiments of the invention. Specifically, FIG. 2 shows another mechanism by which the communication system 100 can operate, without the use of a universal address. For instance, if the sender does not have the recipient's universal address but has the recipient's channel-specific email address, then the communication system 100 can still redirect a message to a preferred client 120 of the recipient via one or more other mechanisms, one of which is shown in FIG. 2. As shown in FIG. 2, the client 120 utilized by the sender may incorporate a client agent 210.

The client agent 210 may be embedded in the client 120 to provide support for the communication system 100. For example, and not by way of limitation, the client agent 210 may be a process installed on the client 120 as a plugin or extension, which may be the case, for instance, if the sender is a user of the communication system 100 and approved the installation of the client agent 210. For another example, a third-party providing the client 120 may natively support the communication system 100 such that the client agent 210 is incorporated into the code of the client 120.

When the user directs a message to be sent to a channel-specific address of a recipient, the client agent 210 may intercept the message and may communicate the channel-specific address to the gateway 110. The gateway 110 may then determine whether the channel-specific address is associated with a registered user of the communication system 100. If the gateway 110 is unable to map the channel-specific address to a user account, the gateway 110 may notify the client agent 210 of such. In that case, the client 120 may handle the message as usual, such as by transmitting the message to a server 130 associated with the client 120 for sending through a communication channel 140 to which the client 120 and the server 130 belong.

However, if the gateway 110 is able to map the channel-specific address to a user account (i.e., if the gateway 110 determines that the channel-specific address is associated with a user account), the gateway 110 may then request that the message be relayed through the gateway 110. In that case, the client agent 210 in the client 120 may transmit the message to the gateway 110. In that case, the gateway 110 may transmit the message through the preferred channel 140 of the recipient (e.g., through a destination server 130 of the preferred communication channel 140), such as by using a channel-specific address of the recipient that corresponds to the preferred communication channel 140.

Figure 3:
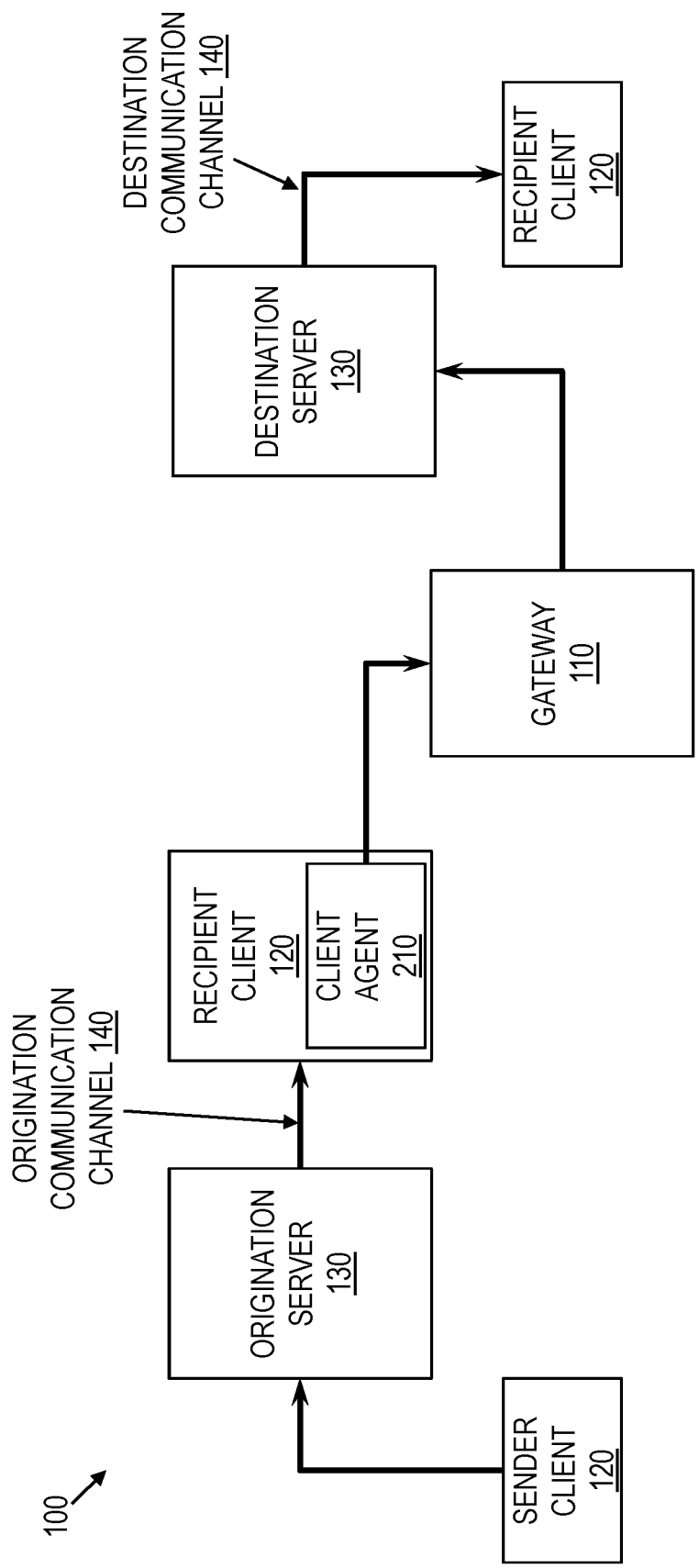
FIG. 3 is yet another block diagram of the communication system, according to some embodiments of the invention.

FIG. 3 is yet another block diagram of the communication system 100, according to some embodiments of the invention. Specifically, FIG. 3 shows a situation when the sender uses a channel-specific address of a recipient and not utilize a client 120 that incorporates a client agent 210 as described above. In this case, the message may be routed from the sender's client 120 to the origination server 130 of the sender's chosen communication channel 140, and from that server 130 to a client 120 belonging to the recipient. However, although the recipient may have access to that client 120, the recipient may not prefer to receive messages on that client 120 and thus may not regularly check that client 120 for new messages. However, the communication system 100 may ensure that the message is additionally transmitted through the recipient's preferred communication channel 140, such that the message can be read at a preferred client 120 of the recipient, if the recipient is a registered user of the communication system 100.

As shown in FIG. 3, the client 120 that receives the message for the recipient may include a client agent 210 in communication with the gateway 110. Upon receiving the message, the client agent 210 may transmit the message to the gateway 110 along with an identifier of the recipient, such as a username, universal address, or other unique identifier of the recipient with respect to the communication system 100. In some embodiments of the invention, before transmitting the message, the client agent 210 may confirm with the gateway 110 that the recipient is a registered user of the communication system 100. The gateway 110 may determine the recipient's preferred communication channel 140 and may retransmit the message to the recipient through that preferred communication channel 140 (e.g., through a destination server 130 of the preferred communication channel 140), such as by using a channel-specific address of the recipient that corresponds to the preferred communication channel 140.

Figure 4:
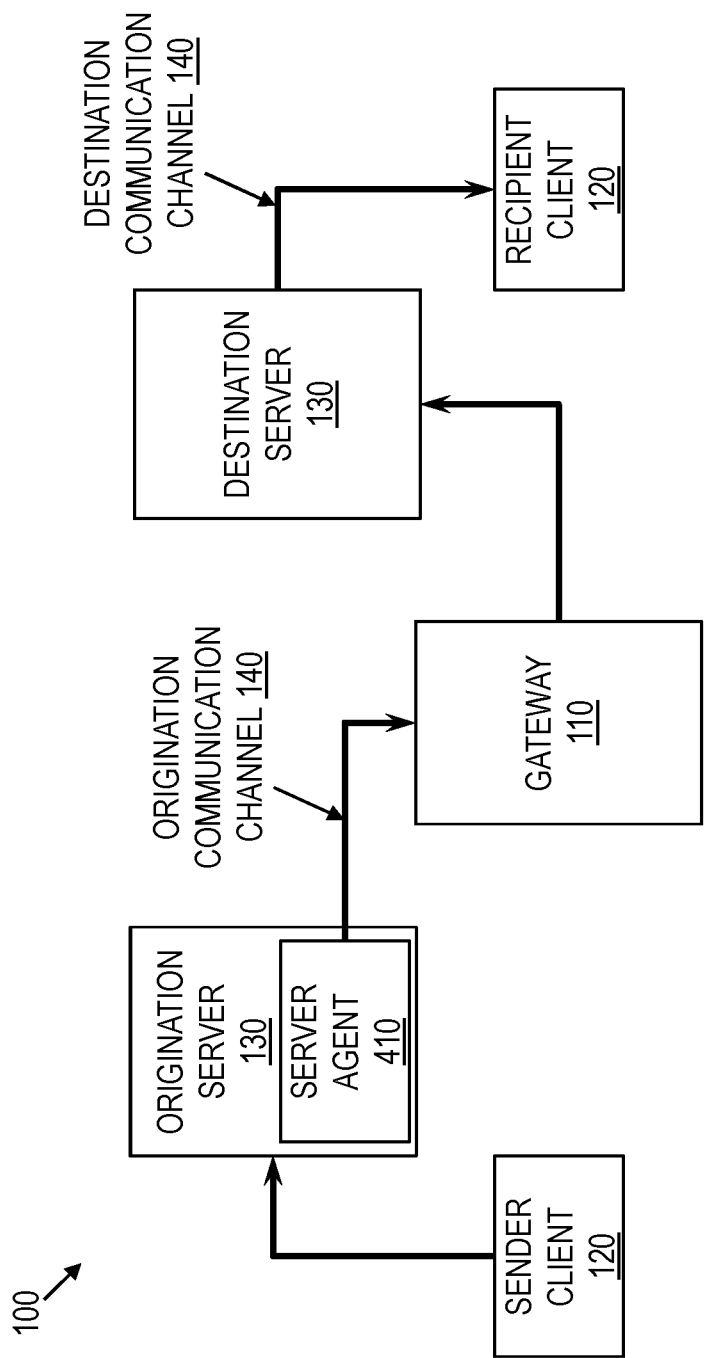
FIG. 4 is yet another block diagram of the communication system, according to some embodiments of the invention.

FIG. 4 is yet another block diagram of the communication system 100, according to some embodiments of the invention. Specifically, FIG. 4 shows an example in which a third-party server 130 incorporates a server agent 410. In this case, a third-party operator of the communication channel 140 of the server 130 is supporting the communication system 100. Upon receiving a message for a recipient, the server agent 410 may transmit the channel-specific address, or other identifying information, of the recipient to the gateway 110, which may determine whether the recipient is a registered user of the communication system 100.

If the recipient is a registered user, then the server 130 may transmit the message to the gateway 110 for delivery, and the gateway 110 may transmit the message through the recipient's preferred communication channel 140 (e.g., by way of a destination server 130 of the preferred communication channel 140. However, if the recipient is deemed not to be registered with the gateway 110, then the gateway 110 may notify the server agent 410 of such, and the server 130 may proceed with delivering the message to the recipient as usual for the communication channel 140 of the server 130.

Thus, as described above, in some embodiments of the invention, a recipient can ensure that he or she receives messages on a preferred client 120 by providing a universal address to others or by running a client agent 210 in each messaging client 120 being used. Further, in some embodiments of the invention, a sender can ensure that he or she is sending a message through the communication system 100, such that a recipient will receive the message at the recipient's preferred client 120 if the recipient is a user of the communication system 100, by utilizing a client 120 running a client agent 210. Further, in some embodiments of the invention, if a server 130 associated with a communication channel 140 supports the communication system 100 by running a server agent 410, then the communication system 100 can ensure delivery through the recipient's preferred client 120.

Although the embodiments described with respect to FIGS. 1-4 are shown separately, it will be understood that the features described with respect to these embodiments can be combined in various ways. For instance, a user may utilize a client 120 incorporating a client agent 210 to send a message to a recipient utilizing a client 120 that also incorporates a client agent 210. Further, a server 130 running a server agent 410 may be used in conjunction with a client agent 210 of a sender or a client agent 210 of a recipient, or both. One of skill in the art will understand that various other combinations may be possible.

As described above with respect to various scenarios, the gateway 110 directs a message to a recipient's preferred communication channel 140. To this end, the gateway 110 determines the recipient's preferred communication channel 140. This determination can be made in various ways, as described below.

When a user registers with the communication system 100, or after registration, the communication system 100 enables the user (i.e., a potential recipient) to specify at least one preferred communication channel 140, as well as a channel-specific address by which the user can be reached on that preferred communication channel 140. The preference of a communication channel 140 can be static or dynamic. In the case of a static preference, the choice of a preferred communication channel 140 follows a strict rule, in that the preferred communication channel 140 is unchanging until the user changes it. In the case of a dynamic preference, the preferred communication channel 140 may change based on one or more rules related to time, day of the week, day of the month, device availability, sender identity, or various other factors. For instance, the user may be enabled to specify a schedule that maps each given time to a preferred communication channel 140. For example, and not by way of limitation, a schedule may be as follows: during specified business hours, the user's preferred communication channel 140 is his or her work email; outside of those business hours on weekdays, the preferred communication channel 140 is personal email; and on weekends, the preferred communication channel 140 is text messaging.

Additionally or alternatively, the communication system 100 may enable the user to schedule times for do not disturb, sleep, or vacation, and at the end of such times, the communication system 100 may send a notification to the user at the user's current preferred communication channel 140. In some embodiments of the invention, the communication system 100 may detect, or the user may indicate to the communication system 100, when the user is inactive on a mobile phone or other device, when the mobile phone or other device is off network, or when others (e.g., family members) are using the mobile phone or other device. In such cases, the mobile phone or other device may be deemed unavailable, which may be a factor in the preference of a communication channel 140. At the end of such an unavailability period, the communication system 100 may send a notification of any waiting messages to the user at the user's current preferred communication channel 140.

Additionally or alternatively, the communication system 100 may enable the user to set priority preferences, or preferences based on filters applied to messages. Such filters may be based on, for example, sender, keywords within messages, subject line, urgency flags, or a detected location of the user. For instance, messages from certain senders may always map to text messaging as a preferred communication channel 140, or messages received at the gateway 110 while a device of the user indicates that the user is at work may always map to work email as a preferred communication channel 140.

In some embodiments of the invention, the rules for the dynamic preference of a communication channel 140 may be fixed by the user, as in the case of a set schedule, or may change based on cognitive learning by the communication system 100. The communication system 100 may enable the user to turn cognitive learning on or off, such that the user can decide whether the communication system 100 may attempt to dynamically update the rules for preferences of communication channels 140.

The communication system 100 may utilize cognitive learning to assign a priority score to each message. The priority score may be a measurement of priority, and if the preference of communication channel 140 depends on priority, the priority score can, therefore, play a role in determining the preferred communication channel 140. The priority score of a message may be based on various factors, such as the following, for example: sender identity, whether the sender is inside the user's organization, existence of keywords in the subject or message body, priority flag, time of day, day of the week, phone availability, whether the user's phone is silenced, and location of the user (e.g., based on mobile device location). More specifically, the priority score may be based on a set of factors, with each factor being assigned a score or rank. The priority score may be calculated as a formula that is a combination of the scores of the factors, such as a weighted average of the various scores corresponding to the factors. In that case, the respective weight assigned to each factor in the weighted average may be variable based on a history of user actions. For instance, if the user is deemed statistically more likely to open messages received in weekdays, then the communication system 100 may increase the weight of the factor that is based on the day of the week. More generally, the more significant a factor appears to be with respect to whether a user opens a message, the more the communication system 100 may weigh the applicable factor.

Additionally or alternatively, the communication system 100 may modify the preference of communication channel 140 based on the use of the various communication channels 140 known to the communication system 100. To this end, the communication system 100 may monitor the user's use of communication channels 140, such as by monitoring the total time the user is actively using a client 120 of each communication channel 140, or such as by monitoring how many messages or what percentage of messages delivered through each communication channel 140 are opened. In some embodiments of the invention, the communication system 100 is required to get permission from the user before the monitoring is performed. If the communication system 100 determines that a first communication channel 140 is more heavily used (e.g., used for a longer period of time, or a greater number or percentage of messages are opened) than the preferred communication channel 140 under given circumstances, the communication system 100 may dynamically update the preference of communication channels 140 to make the first communication channel 140 preferred under those given circumstances. In other words, the communication system 100 may be enabled to modify one or more rules determining which communication channel 140 is preferred.

In some embodiments of the invention, however, when changing the preference of communication channel 140 or when changing the weights assigned to factors, the communication system 100 may prompt the user with a request or a notification relating to the change. For instance, the communication system 100 may request permission to make the change or may notify the user that the change has been made. For example, and not by way of limitation, this prompt may be given by a client agent 210 running on a client 120, or may be given via message to the communication channel 140 currently set as the preferred communication channel 140 when the prompt is being made. Additionally or alternatively, periodically or responsive to a change being made, the communication system 100 may enable the user to submit feedback indicating whether the user is pleased with the current settings (e.g., the current set of rules for determining the preference of a communication channel 140). This feedback may be used to determine what further changes are made in the future, or whether one or more particular changes are undone.

In some cases, the standard format of an origination channel 140 (i.e., the communication channel 140 used by a sender to send a message to a recipient) differs from the standard format of messages on a destination channel 140 (i.e., the preferred communication channel 140 by which the message is delivered). Messages can take various formats, such as plain text, HTML, or audio. For instance, suppose the sender sends a message in text format via text messaging, but the recipient's preferred communication channel 140 given current circumstances is voice mail, which expects to receive messages in audio format. Thus, in some embodiments of the invention, the gateway 110 may be configured to convert the message into a format appropriate for the preferred communication channel 140. On the part of the gateway 110, the conversion may involve requesting that a third party, such as a webservice, perform the required conversion. Alternatively, however, the gateway 110 may perform such conversion locally.

In some embodiments of the invention, each communication channel 140 known the gateway 110 may be associated, in the communication system 100, with at least one standard format. Upon receiving a message to be transmitted to a recipient, and upon determining the preferred communication channel 140 for the recipient, the gateway 110 may map the preferred communication channel 140 to the one or more standard formats associated with that preferred communication channel 140. If none of the associated standard formats match the current format of the message, the gateway 110 may convert the message to one of the associated standard formats of the preferred communication channel 140. The converted version of the message may then be the message transmitted to the recipient through preferred communication channel 140.

In some cases, converting the message may cause the message to be clipped, such as in the case where the format of the preferred communication channel 140 requires a limited size (e.g., a limited number of characters, a limited length, a limited storage size), and in that case, the message may be transmitted as, or including, a link or other notification indicating how the recipient can retrieve the remainder of the message, or the message may be split and transmitted as a group of two or more messages.

Figure 5:
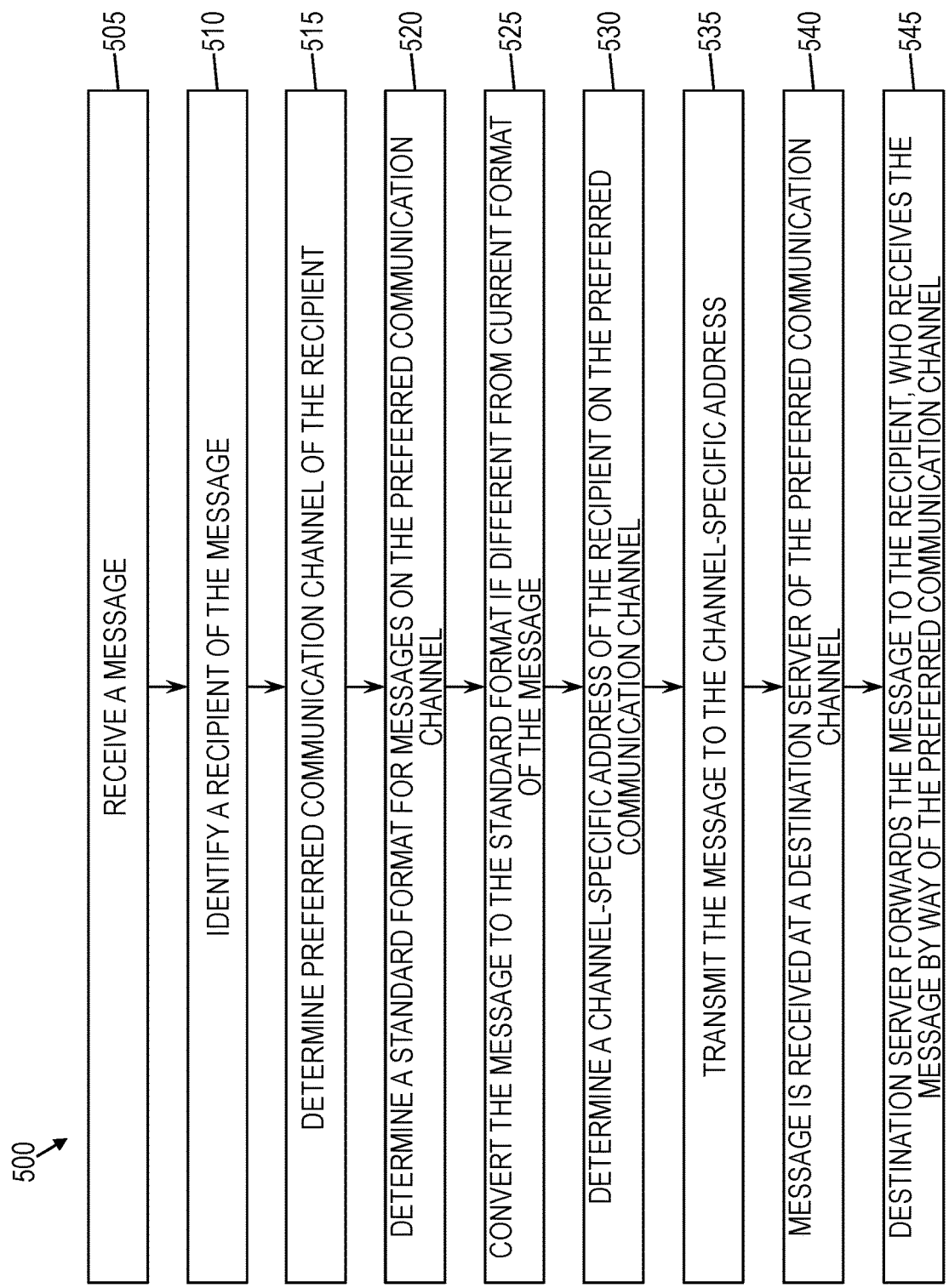
FIG. 5 is a flow diagram of a method of intelligently communicating across heterogeneous communication channels, according to some embodiments of the invention.

FIG. 5 is a flow diagram of a method 500 of intelligently communicating from one user to another across heterogeneous communication channels 140, according to some embodiments of the invention. It will be understood that this method 500 is illustrative only and does not limit the various embodiments of the invention. As shown in FIG. 5, at block 505, the gateway 110 receives a message directed to a recipient. The message may be received from, for example, an origination server 130 (e.g., in the case where a universal address of the recipient was used as in FIG. 1), a sending client 120 (e.g., in case where the message is intercepted by a client agent 210 at the sending client 120 as in FIG. 2), a recipient client 120 (e.g., in the case where the message is intercepted by a client agent 210 at the recipient client 120 as in FIG. 3), or an origination server 130 (e.g., in the case where the message is intercepted by a server agent at the origination server 130 as in FIG. 4).

At block 510, the gateway 110 identifies a recipient of the message. At block 515, the gateway 110 determines a preferred communication channel 140 of the recipient. This determination may require an evaluation of one or more rules applicable to the recipient for determining a preference among communication channels 140 under a current set of circumstances.

At block 520, the gateway 110 determines a standard format of messages sent through the preferred communication channel 140, such as by mapping the preferred communication channel 140 to a standard format according to a preestablished mapping. At block 525, if the standard format differs from the current format of the message, the gateway 110 converts the message into the standard format.

At block 530, the gateway 110 determines a channel-specific address of the recipient on the preferred communication channel 140. For instance, the recipient may have previously indicated a respective channel-specific address for each communication channel 140 registered with the communication system 100 by the recipient, and thus, the gateway 110 may map the preferred communication channel 140 to the channel-specific address of the recipient with respect to that communication channel 140. At block 535, the gateway 110 transmits the message to the channel-specific address of the preferred communication channel 140 of the recipient. At block 540, the message may be received at a server 130 associated with the preferred communication channel 140, and at block 545, the server 130 may forward the message to the recipient at the channel-specific address. As such, the recipient may receive the message through the recipient's preferred communication channel 140.

Figure 6:
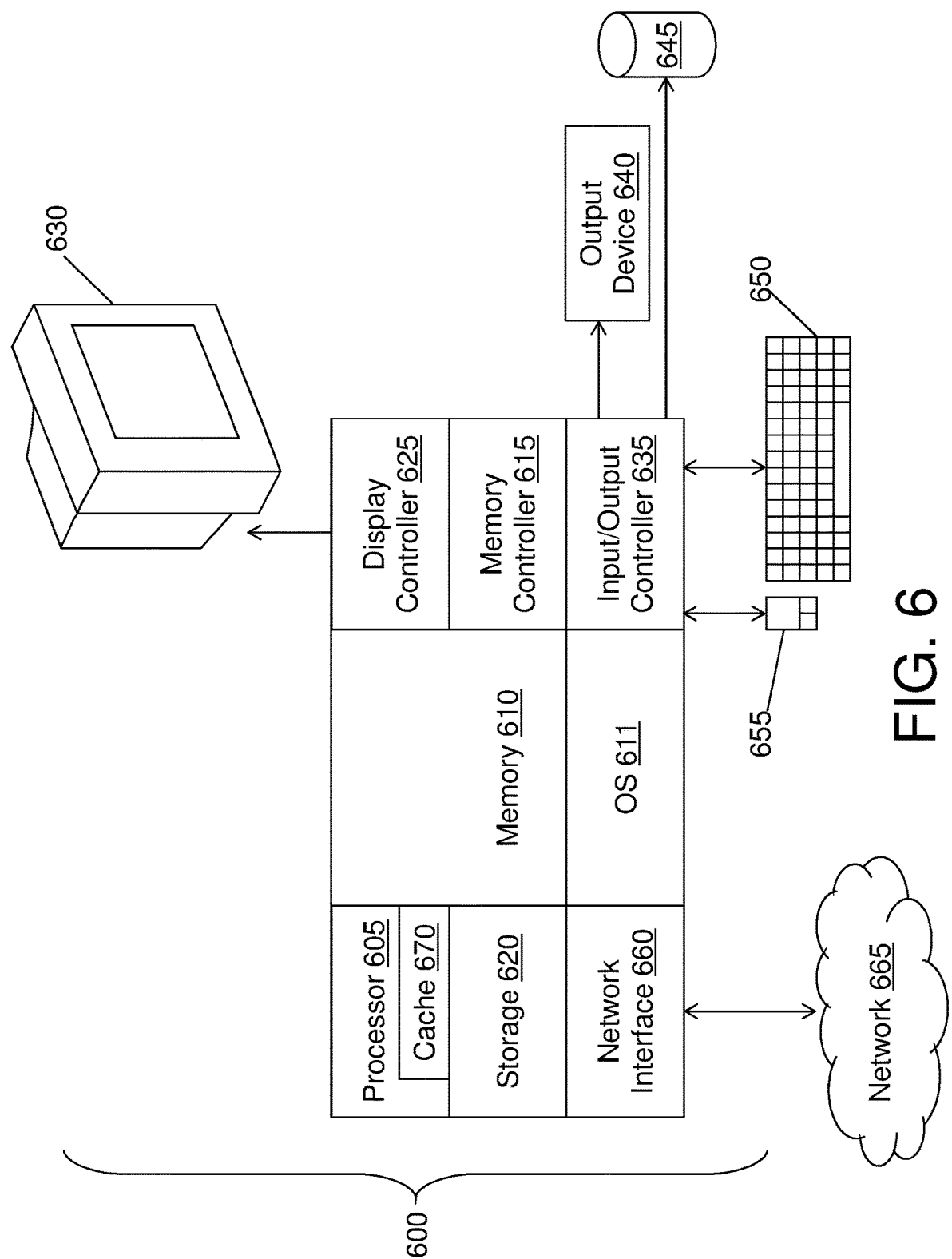
FIG. 6 is a block diagram of a computer system for implementing some or all aspects of the communication system, according to some embodiments of this invention.

FIG. 6 is a block diagram of a computer system 600 for implementing some or all aspects of the communication system 100, according to some embodiments of this invention. The communication systems 100 and methods described herein may be implemented in hardware, software (e.g., firmware), or a combination thereof. In some embodiments, the methods described may be implemented, at least in part, in hardware and may be part of the microprocessor of a special or general-purpose computer system 600, such as a personal computer, workstation, minicomputer, or mainframe computer. For example, and not by way of limitation, the gateway 110 may be a computer system 600 or portion thereof, and the client agent 210 and server agent 410 may each be processes running on a computer system 600.

In some embodiments, as shown in FIG. 6, the computer system 600 includes a processor 605, memory 610 coupled to a memory controller 615, and one or more input devices 645 and/or output devices 640, such as peripherals, that are communicatively coupled via a local I/O controller 635. These devices 640 and 645 may include, for example, a printer, a scanner, a microphone, and the like. Input devices such as a conventional keyboard 650 and mouse 655 may be coupled to the I/O controller 635. The I/O controller 635 may be, for example, one or more buses or other wired or wireless connections, as are known in the art. The I/O controller 635 may have additional elements, which are omitted for simplicity, such as controllers, buffers (caches), drivers, repeaters, and receivers, to enable communications.

The I/O devices 640, 645 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 605 is a hardware device for executing hardware instructions or software, particularly those stored in memory 610. The processor 605 may be a custom made or commercially available processor, a central processing unit (CPU), an auxiliary processor among several processors associated with the computer system 600, a semiconductor-based microprocessor (in the form of a microchip or chip set), a macroprocessor, or other device for executing instructions. The processor 605 includes a cache 670, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 670 may be organized as a hierarchy of more cache levels (L1, L2, etc.).

The memory 610 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, or other types of storage media. Note that the memory 610 may have a distributed architecture, where various components are situated remote from one another but may be accessed by the processor 605.

The instructions in memory 610 may include one or more separate programs, each of which comprises an ordered listing of executable instructions for implementing logical functions. In the example of FIG. 6, the instructions in the memory 610 include a suitable operating system (OS) 611. The operating system 611 essentially may control the execution of other computer programs and provides scheduling, input-output control, file and data management, memory management, and communication control and related services.

Additional data, including, for example, instructions for the processor 605 or other retrievable information, may be stored in storage 620, which may be a storage device such as a hard disk drive or solid-state drive. The stored instructions in memory 610 or in storage 620 may include those enabling the processor to execute one or more aspects of the communication systems 100 and methods of this disclosure.

The computer system 600 may further include a display controller 625 coupled to a display 630. In some embodiments, the computer system 600 may further include a network interface 660 for coupling to a network 665. The network 665 may be an IP-based network for communication between the computer system 600 and an external server, client and the like via a broadband connection. The network 665 transmits and receives data between the computer system 600 and external systems. In some embodiments, the network 665 may be a managed IP network administered by a service provider. The network 665 may be implemented in a wireless fashion, e.g., using wireless protocols and technologies, such as WiFi, WiMax, etc. The network 665 may also be a packet-switched network such as a local area network, wide area network, metropolitan area network, the Internet, or other similar type of network environment. The network 665 may be a fixed wireless network, a wireless local area network (LAN), a wireless wide area network (WAN) a personal area network (PAN), a virtual private network (VPN), intranet or other suitable network system and may include equipment for receiving and transmitting signals.

Communication systems 100 and methods according to this disclosure may be embodied, in whole or in part, in computer program products or in computer systems 600, such as that illustrated in FIG. 6.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, at a gateway, a message for a plurality of recipients, the message being received from a sender via a first communication channel;
   evaluating, by the gateway, one or more rules to select a respective preferred communication channel of each recipient from the plurality of recipients, the preferred communication channel being one from among two or more communication channels, and wherein a first preferred communication channel of a first recipient is different from a second preferred communication channel of a second recipient, the first recipient and the second recipient being from the plurality of recipients, wherein each respective preferred communication channel of each recipient is determined based on the recipient actively using said specific preferred communication channel at the time the gateway receives the message;
   determining, by the gateway, a channel-specific address of each recipient on the respective preferred communication channel corresponding to the recipient; and
   directing, by the gateway, the message to the channel-specific address of each recipient to deliver the message to the recipients through the respective preferred communication channel.

2. The computer-implemented method of claim 1, wherein the message is sent by a sender to a first address of the first recipient, which is distinct from the channel-specific address of the first preferred communication channel of the first recipient.

3. The computer-implemented method of claim 1, further comprising:
   determining, by the gateway, a current format of the message;
   determining, by the gateway, a standard format of messages on each respective preferred communication channel; and
   converting, by the gateway, the message from the current format to the standard format of each respective preferred communication channel.

4. The computer-implemented method of claim 1, further comprising updating the one or more rules for selecting the first preferred communication channel based on monitoring the use of the two or more communication channels by the first recipient.

5. The computer-implemented method of claim 1, wherein evaluating the one or more rules to select the preferred communication channel comprises:
   calculating a priority score for the message; and
   determining the respective preferred communication channel for each of the recipients based on the priority score.

6. The computer-implemented method of claim 5, wherein the priority score is determined based on an identity of a sender of the message.

7. The computer-implemented method of claim 4, wherein the one or more rules for selecting the first preferred communication channel are updated based on at least one from a total time the first recipient is using the first preferred communication channel, and a percentage of messages delivered via the first preferred communication channel being opened.

8. A system comprising:
   a gateway comprising:
   a memory; and
   one or more computer processors communicatively coupled to the memory, the one or more computer processors configured to:
   receive a message for a plurality of recipients, the message being received from a sender via a first communication channel;
   evaluate one or more rules to select a respective preferred communication channel of each recipient from the plurality of recipients, the preferred communication channel being one from among two or more communication channels, and wherein a first preferred communication channel of a first recipient is different from a second preferred communication channel of a second recipient, the first recipient and the second recipient being from the plurality of recipients, wherein each respective preferred communication channel of each recipient is determined based on the recipient actively using said specific preferred communication channel at the time the gateway receives the message;

determine a channel-specific address of each recipient on the respective preferred communication channel corresponding to the recipient; and direct the message to the channel-specific address of each recipient to deliver the message to the recipients through the respective preferred communication channel.

9. The system of claim 8, wherein the message is sent by a sender to a first address of the first recipient, which is distinct from the channel-specific address of the first preferred communication channel of the first recipient.

10. The system of claim 8, further comprising:
a client agent embedded in a messaging client, wherein the client agent is configured to intercept the message and transmit the message to the gateway.

11. The system of claim 8, further comprising a server agent embedded in a messaging server, wherein the server agent is configured to:
receive the message from a messaging client of the sender; and
intercept the message and transmit the message to the gateway.

12. The system of claim 8, wherein the one or more computer processors of the gateway are further configured to:
determine a current format of the message;
determine a standard format of messages on each respective preferred communication channel; and
convert the message from the current format to the standard format of each respective preferred communication channel.

13. The system of claim 8, wherein the one or more computer processors of the gateway are further configured to update the one or more rules for selecting the first preferred communication channel based on monitoring the use of the two or more communication channels by the first recipient.

14. The system of claim 8, wherein evaluating the one or more rules to select the preferred communication channel comprises:
calculating a priority score for the message; and
determining the respective preferred communication channel for each of the recipients based on the priority score.

15. The system of claim 9, wherein the first preferred communication channel is determined based on an identity of the sender of the message.

16. The system of claim 9, wherein the one or more computer processors are further configured to update the one or more rules for selecting the first preferred communication channel, the update is based on at least one of a total time the first recipient is using the first preferred communication channel, and a percentage of messages delivered via the first preferred communication channel being opened.

17. A computer-program product for delivering a message through a preferred communication channel, the computer-program product comprising a non-transitory computer-readable storage medium having program instructions embodied therewith, the program instructions executable by a processor to cause the processor to perform a method comprising:
receiving, at a gateway, a message for a plurality of recipients, the message being received from a sender via a first communication channel;
evaluating, by the gateway, one or more rules to select a respective preferred communication channel of each recipient from the plurality of recipients, the preferred communication channel being one from among two or more communication channels, and wherein a first preferred communication channel of a first recipient is different from a second preferred communication channel of a second recipient, the first recipient and the second recipient being from the plurality of recipients, wherein each respective preferred communication channel of each recipient is determined based on the recipient actively using said specific preferred communication channel at the time the gateway receives the message;
determining, by the gateway, a channel-specific address of each recipient on the respective preferred communication channel corresponding to the recipient; and
directing, by the gateway, the message to the channel-specific address of each recipient to deliver the message to the recipients through the respective preferred communication channel.

18. The computer-program product of claim 17, wherein the message is sent by a sender to a first address of the first recipient, which is distinct from the channel-specific address of the first preferred communication channel of the first recipient.

19. The computer-program product of claim 17, the method further comprising:
determining, by the gateway, a current format of the message;
determining, by the gateway, a standard format of messages on each respective preferred communication channel; and
converting, by the gateway, the message from the current format to the standard format of each respective preferred communication channel.

20. The computer-program product of claim 17, the method further comprising updating the one or more rules for selecting the first preferred communication channel based on monitoring the use of the two or more communication channels by the first recipient.

* * * * *